May 26, 1925.
J. A. McCROHAN ET AL
1,539,052
CALENDERING, EMBOSSING, AND CUTTING MACHINE
Filed March 13, 1924    4 Sheets-Sheet 1
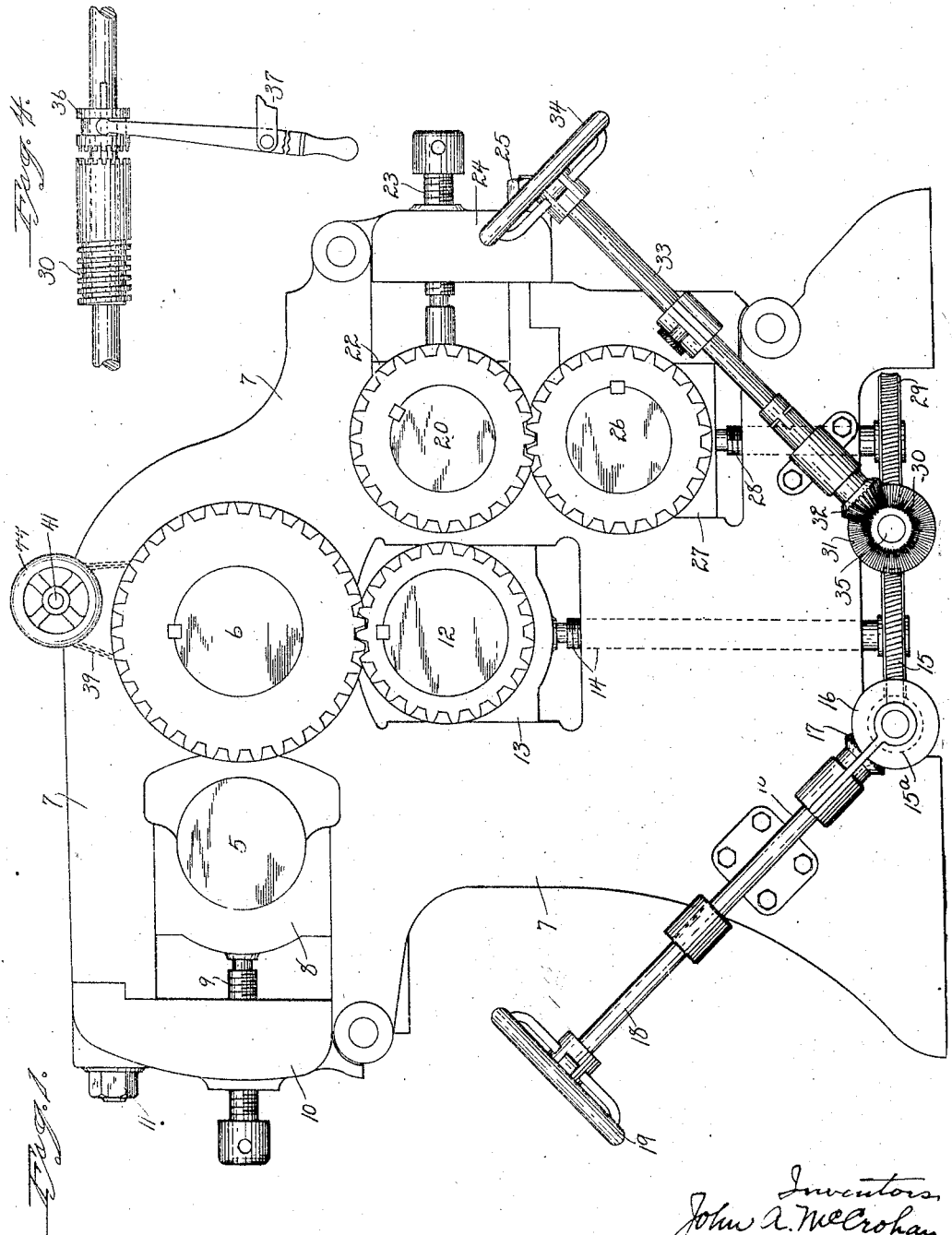

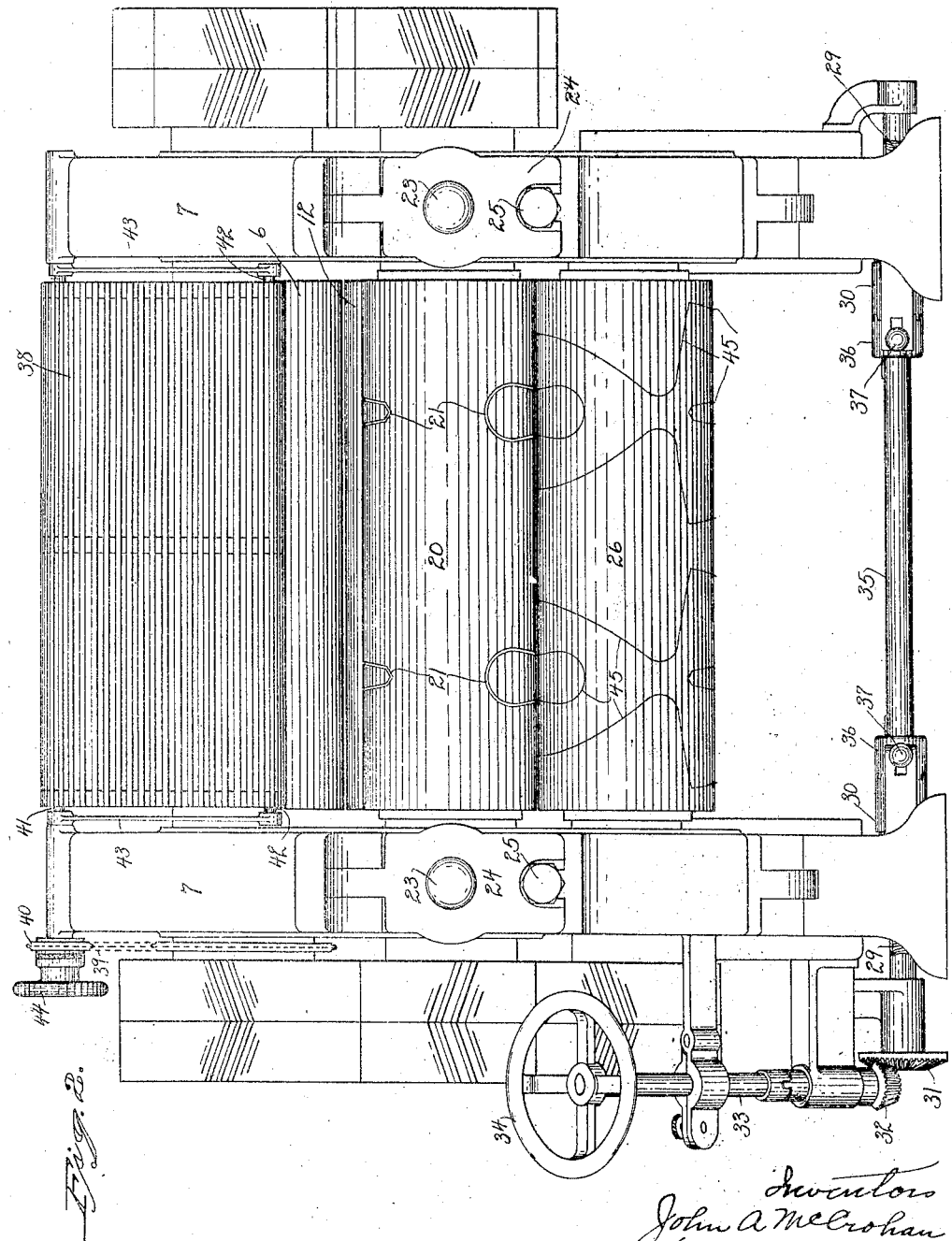

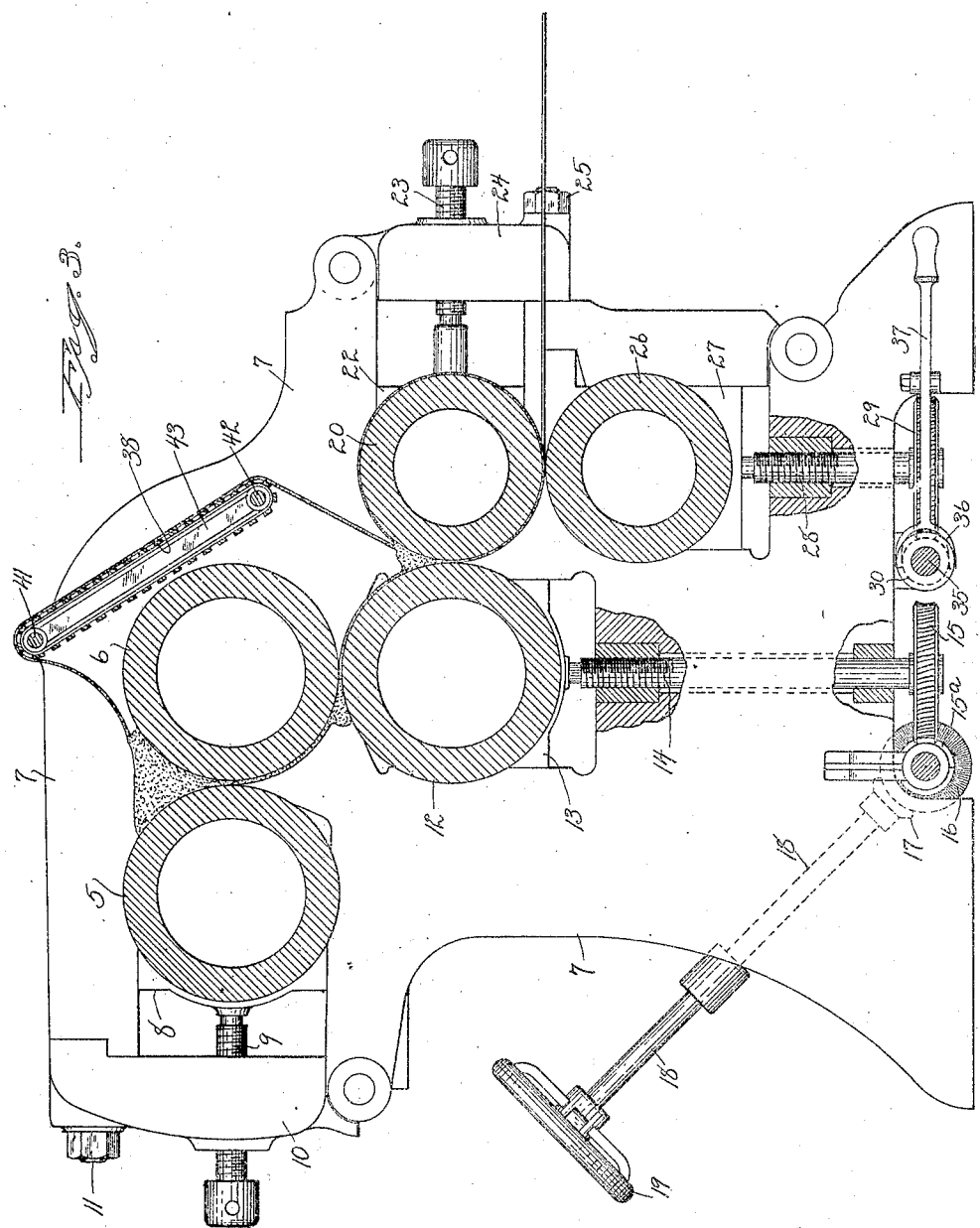

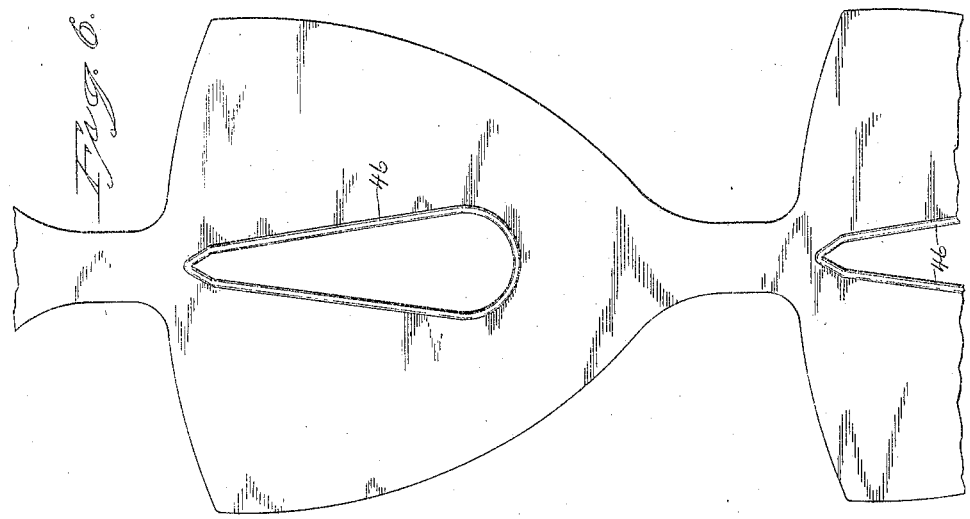
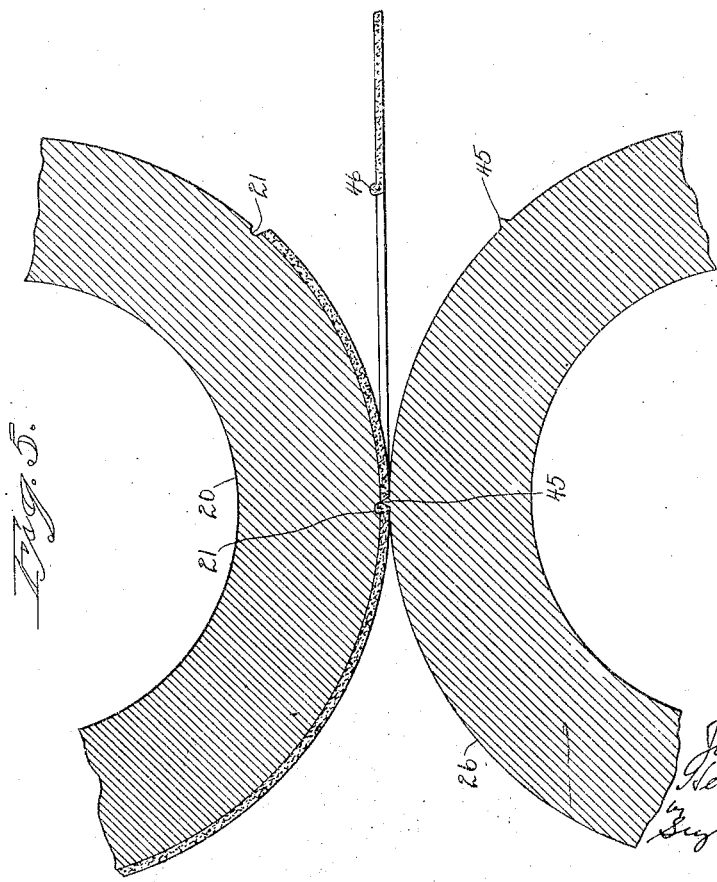

Patented May 26, 1925.

1,539,052

UNITED STATES PATENT OFFICE.

JOHN ANDREW McCROHAN AND HERBERT C. ERICH, OF NEW HAVEN, CONNECTICUT.

CALENDERING, EMBOSSING, AND CUTTING MACHINE.

Application filed March 13, 1924. Serial No. 698,955.

REISSUED

*To all whom it may concern:*

Be it known that we, JOHN A. McCROHAN and HERBERT C. ERICH, citizens of the United States, residing at New Haven, in the county of New Haven and State of Connecticut, have invented a new and useful Improvement in Calendering, Embossing, and Cutting Machines; and we do hereby declare the following, when taken in connection with the accompanying drawings and the characters of reference marked thereon, to be a full, clear, and exact description of the same, and which said drawings constitute part of this application, and represent in—

Fig. 1 a side view of a rubber cutting and embossing calendering machine constructed in accordance with our invention.

Fig. 2 a front view of the same.

Fig. 3 a side view, partly in section, showing the relative position of the various rolls and means for adjusting.

Fig. 4 a broken detail view of adjusting means for the cutting-roll.

Fig. 5 a broken view, showing parts of the embossing-roll and cutting-roll.

Fig. 6 a plan view of a blank formed in the machine and provided with an embossed edge.

This invention relates to improvements in rubber cutting and embossing calendering machines particularly adapted for forming articles of sheet-rubber, such as overshoes, where it is desirable to provide the edges with a raised surface or rib, and to cut out the blank for the overshoe, so that, when cut out, it will be provided with an embossed edge. Machines for cutting forms after they have passed through calender-rolls have been produced, and rolls for embossing the edges of articles have been used. The object of this invention is to combine an embossing-roll and a cutting-roll with calendering rolls, and the invention consists in the construction as hereinafter described and particularly recited in the claims.

In carrying out our invention, we employ a pair of calender-rolls 5 and 6, arranged side by side and mounted in a suitable frame 7, the bearings 8 for the ends of the roll 5 being adjustable by means of capstan screws 9 mounted in gates 10 pivotally connected at one end with the frame of the machine, and adapted to be secured at the opposite end to the frame of the machine by screws 11. Directly below the calender-roll 6 is a third calender-roll 12, the bearings 13 of which are adapted to be raised and lowered by screws 14 provided at their lower ends with worm-gears 15 meshing with worms 15ª adapted to be turned through a bevel-gear 16 meshing with a bevel-pinion 17 on the lower end of an operating-rod 18 which projects upwardly and rearwardly, and is provided with an operating hand-wheel 19. It will be understood that both ends of the roll 12 are provided with adjusting means (Figs. 1 and 3). At the side of the calender-roll 12 is an embossing-roll 20, formed in its surface with channels 21 corresponding in form to the design of the embossing to appear on the surface of the finished article. This roll is also mounted in the frame and provided at opposite ends with bearing-blocks 22 adapted to be adjusted by capstan screws 23 mounted in gates 24 hinged at their upper ends in the frame and connected at their lower ends with the frame by bolts 25. Directly below the embossing-roll is a cutting-roll 26 supported on bearing-blocks 27 which are moved by screws 28 provided at their lower ends with worm-gears 29. These worm-gears are turned by worms 30 on a shaft 35 provided at its outer end with a bevel-gear 31 meshing with a bevel-pinion 32 at the lower ends of an operating-shaft 33, which is also provided at its upper end with an operating hand-wheel 34. The worms 30 are loose on a shaft 35 and on this shaft, adjacent to each worm, is a sliding clutch-member 36 keyed to the shaft 35 and adapted to be moved into or out of engagement with the worm by operating-handles 37, so that the cutting-roll may be adjusted at either or both ends by a hand-wheel 34.

It will be understood that the calender-rolls, embossing-roll and cutting-roll are provided at the ends with the usual gear-wheels by which they are moved at the desired relative speed and driven by any suitable means, not shown.

Forward of the calender-roll 6 is a slat-conveyor 38, driven from one of the shafts by a sprocket-chain 39 engaging with a sprocket 40 on the upper shaft 41 of the conveyor, the lower shaft 42 being connected with the upper shaft 41 by links 43 fixed to the shaft 41, which is provided at its outer end with a hand-wheel 44, so that the lower end of the conveyor may be turned upward when desired.

Stock is fed between the calender-rolls 5 and 6, by which it is sheeted, and passes downward between them and between the calender-rolls 6 and 12, where the stock is further reduced in thickness. The stock then follows the roll 12 and the embossing-roll 20, where the stock is forced into the grooves 21 therein, and, at the same time, may be further reduced in thickness by compression between these two rolls. The stock then passes between the embossing-roll 20 and cutting-roll 26, which is provided with cutting-edges 45 corresponding to the design to be cut out, and the design is so arranged that they are connected with the next form, so that the forms are delivered from the machine in a continuous strip. The surplus material is carried upward by the embossing-roll and onto the conveyor 38, by which it is carried up and delivered between the rolls 5 and 6 for further manipulation and passage through the machine.

With this construction, the cutting-roll may be adjusted with relation to the embossing-roll, so that the distances between them always correspond to the projection of the cutters beyond the cutting-roll, so that, as these wear down, the cutting-roll may be raised so as to always be operative until the cutters are worn down below a predetermined point, according to the thickness of the stock passing through.

The article cut out, herein represented in Fig. 6, is a blank for an overshoe, and is provided around its upper edge with an embossed edge 46 of any desired configuration, this embossing being formed in the stock as it passes through the machine, so as to avoid the necessity of a separate operation.

We claim:

1. In a machine of the class specified, the combination with a pair of calender-rolls arranged side by side, a third calender-roll arranged directly below the second calender-roll, an embossing-roll arranged forward of and in line with the third calender-roll, a cutting-roll arranged below the embossing-roll, means for driving said rolls, said cutting-roll mounted on bearings on vertically-arranged screws, worm-gears on the lower ends of said screws, worms meshing with said worm-gears, said worms arranged on a horizontal shaft, means for coupling said worms with said shaft, and means for turning said worms.

2. In a machine of the class specified, the combination with a pair of calender-rolls arranged side by side, a third calender-roll arranged directly below the second calender-roll, an embossing roll arranged forward of and in line with the third calender-roll, a cutting-roll arranged below the embossing-roll, means for driving said rolls, said cutting-rolls mounted on bearings on vertically-arranged screws, worm-gears on the lower ends of said screws, worms meshing with said worm-gears, said worms arranged on a horizontal shaft, means for coupling said worms with said shaft, and means for turning said worms, including an upwardly and forwardly projecting operating-shaft.

3. In rubber cutting and embossing calendering machines, the combination with a calender-roll having a fixed axis of rotation, other calender-rolls cooperating therewith and arranged in relatively different planes with respect thereto, said last mentioned calender-rolls being mounted for relative individual adjustment with respect to the fixed calender roll and the direction of such adjustment being at different angles, an adjustable embossing roll arranged adjacent to and in the same plane as one of the adjustable calender-rolls and having a direction of adjustment parallel to the remaining calender-roll, and an adjustable cutting-roll adjacent said embossing-roll and having a direction of adjustment parallel with that of the calender-roll mounted adjacent to the embossing-roll whereby various gauges of stock may be cut and embossed by relatively adjusting the cutting-roll and embossing-roll.

In testimony whereof, we have signed this specification in the presence of two subscribing witnesses.

JOHN ANDREW McCROHAN.
HERBERT C. ERICH.

Witnesses:
H. T. WINKELMANN,
F. O. UIHLEIN.